Figure 1:
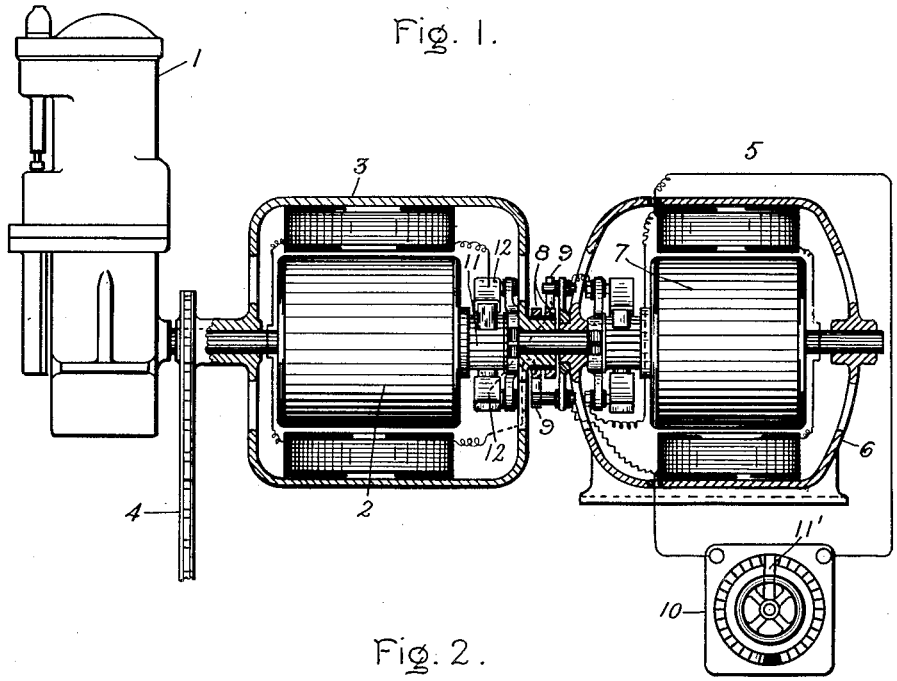

No. 808,263. PATENTED DEC. 26, 1905.
E. THOMSON.
POWER TRANSMITTING MECHANISM.
APPLICATION FILED NOV. 26, 1902. RENEWED AUG. 22, 1904.

3 SHEETS—SHEET 1.

WITNESSES.
George W. Tilden.
Fred Orford.

INVENTOR
Elihu Thomson.
By Albert G. Davis
Atty.

No. 808,263. PATENTED DEC. 26, 1905.
E. THOMSON.
POWER TRANSMITTING MECHANISM.
APPLICATION FILED NOV. 26, 1902. RENEWED AUG. 22, 1904.
3 SHEETS—SHEET 2.
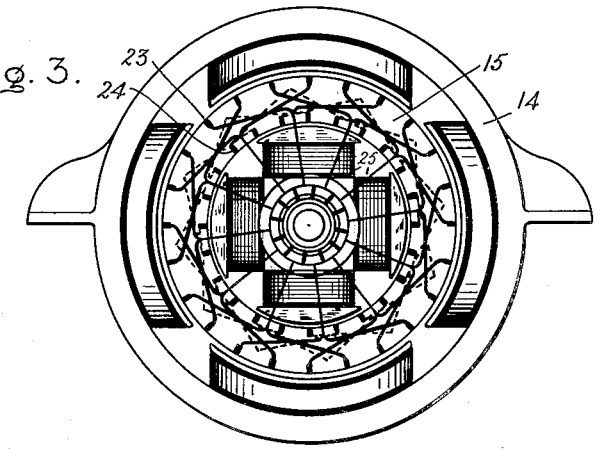
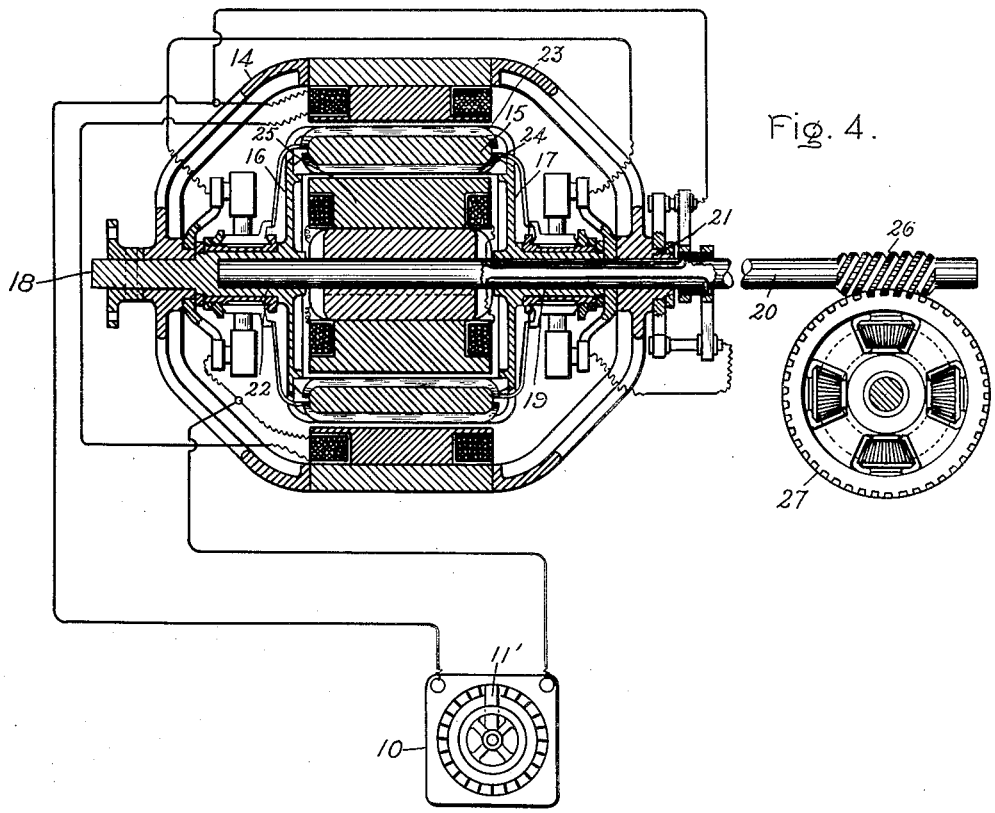
WITNESSES.
George W. Tilden
Arlen Orford
INVENTOR.
Elihu Thomson
By Albert G. Davis
Atty.

No. 808,263. PATENTED DEC. 26, 1905.
E. THOMSON.
POWER TRANSMITTING MECHANISM.
APPLICATION FILED NOV. 26, 1902. RENEWED AUG. 22, 1904.

3 SHEETS—SHEET 3.

Witnesses.
George W. Tilden.
Helen Orford.

Inventor.
Elihu Thomson.
by Albert G. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

POWER-TRANSMITTING MECHANISM.

No. 808,263.        Specification of Letters Patent.        Patented Dec. 26, 1905.

Application filed November 26, 1902. Renewed August 22, 1904. Serial No. 221,706.

*To all whom it may concern:*

Be it known that I, ELIHU THOMSON, a citizen of the United States, residing at Swampscott, county of Essex, State of Massachusetts, have invented certain new and useful Improvements in Power-Transmitting Mechanisms, of which the following is a specification.

The invention relates to a means for transmitting mechanical power, and is embodied in a mechanism in which a prime mover or other source of mechanical power running at a constant speed or at any speed independent of the speed of the load is geared to the load through an electric transmitting device, whereby the speed of the object driven and the torque exerted thereon are controllable at will by the operator. Generally speaking, the electric transmitting device consists of a generator element and a motor element, torque being transmitted to the load through the reaction of the relatively movable members of the generator while the current developed by the generator is passed to the motor, by which it is transformed into mechanical energy, which is then applied to assist the prime mover. The speed and torque conveyed to the load from the prime mover are primarily controlled by controlling the electrical energy developed in the generator; but this energy instead of being wastefully converted into heat in resistances or the like is reconverted into mechanical energy and applied to assist the main driving-machine or prime mover. Furthermore, I control the electric energy by varying the relative field strengths of the two machines, thereby varying the relative torque of the two machines per ampere of current flowing through them. By thus varying the relative torque per ampere of the two machines the relative torque of prime mover and driven member may be controlled so that the power delivered by the prime mover may be transmitted to the driven member with the speed-torque factors altered in any desired manner—that is, with increased torque and lowered speed, or vice versa—and this result is accomplished without the use of batteries or other external sources of electromotive force or current whatever.

The features of novelty which I believe characterize my invention I have pointed out with particularity in the appended claims, while the invention itself I have described in detail in the following specification, which is to be taken in connection with the accompanying drawings, which serve as illustrations of a few of the various embodiments of which my invention is capable.

Figure 2:
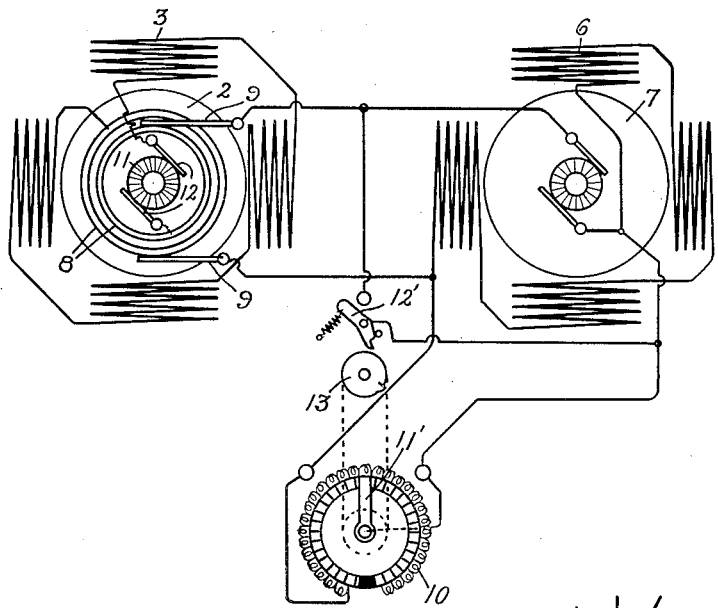
Figure 5:
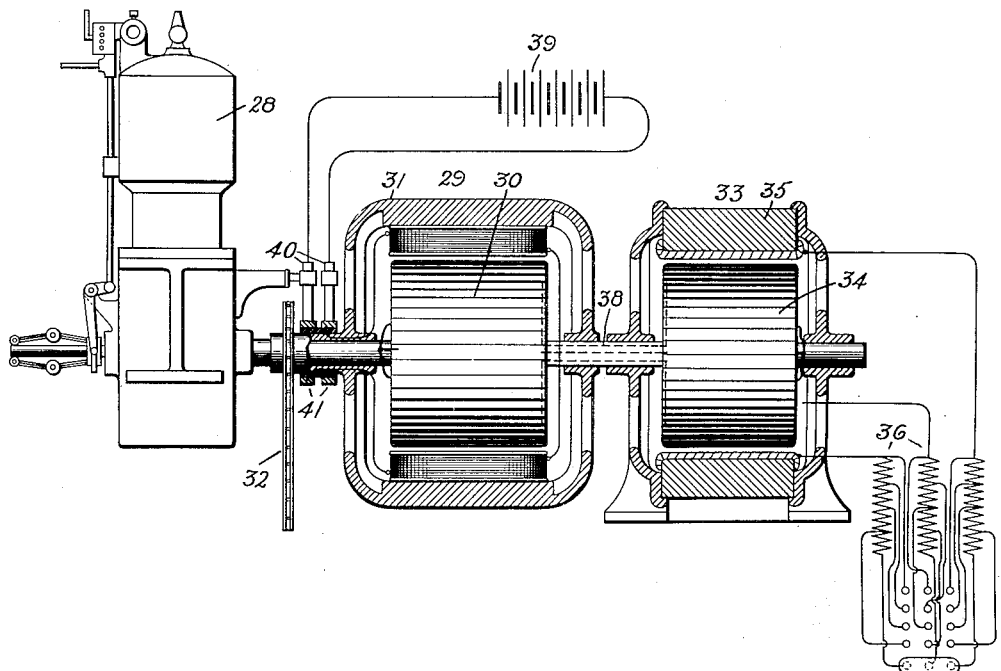
Figure 6:
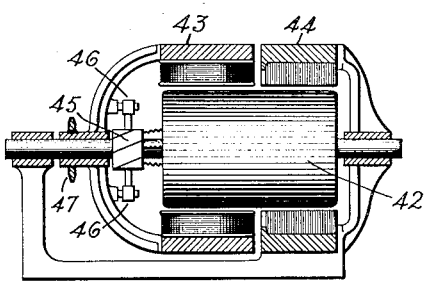

In Figure 1 is represented one embodiment of my invention, while Fig. 2 is a diagram of the electric circuits thereof. Figs. 3 and 4 are views, one in end elevation and the other partly in section, of a modification thereof, while Figs. 5 and 6 illustrate still another modification of my invention.

In Fig. 1 the prime mover is represented at 1. In the present instance a gas-engine is represented conventionally as the prime mover, but it is to be understood that any other source of power may take the place thereof—such, for example, as a steam-engine, water-wheel, or electric motor. For convenience I call the power-developing device 1 a "prime mover;" but it is to be understood that my invention contemplates any source of mechanical power, whether that source be of the nature of a prime mover or receives its energy from some other source, as is characteristic of an electric motor. The prime mover or other source of power 1 is connected so as to drive one element of an electric generator—in this case the armature 2 of a direct-current generator, the field structure 3 of which instead of being fixed is also rotatably mounted about the axis of rotation of the armature. A sprocket-chain 4 may be used to transmit motion from the rotatable element 3 of the generator to any mechanism which it may be desired to drive. I have considered it unnecessary to an understanding of my invention to illustrate any of the various driven mechanisms in connection with which my invention may be utilized. My power-transmitting mechanism is, however, of value in connection with automobiles or other mechanisms the speed and torque of which require to be readily varied. By varying the amount of energy developed by the generator element of the mechanism a corresponding variation takes place in the reactive torque between the field and armature of the generator. The torque transmitted through the sprocket-chain 4 depends upon the amount of the reaction, while the speed, of course, depends upon the difference in speed of the two members 2 and 3 of the generator element, both members of which rotate in the same direction, the armature 2, however, rotating faster than the field member 3. By changing the strength of field of the member 3 or the amount of the current flowing in the armature 2, or both, changes in the reaction exerted between the armature-conductors and the magnetic field through which they pass take place. For convenience I prefer to connect the armature in series with the field-winding, whereby simultaneous variation of armature-current and field strength take place; but it is evident that various other combinations of circuits for producing substantially the same result may be used without departing from the spirit of my invention. It would be feasible to control the speed and torque transmitted to the load by no more apparatus than that already described, an external resistance being in such a case connected in series with the generator, the variation of this resistance by hand or otherwise serving to accomplish the object aimed at. This particular arrangement is, however, obviously wasteful, since the energy developed by relative motion of the armature 2 and field 3 is wasted in the form of heat in the resistance. Instead of making use of such resistance I pass the current thus generated to a motor 5, having a fixed field-magnet structure 6 and an armature 7, both of ordinary construction. The armature of this motor may be coupled directly to the armature 2 of the generator, as shown, or it may be connected or geared in any other way, so that the torque exerted thereby serves to assist the prime mover 1 in driving the load. This motor may be connected up in a variety of ways, either as a shunt-motor, series motor or, the like. For the present purpose I find the series connection to be satisfactory, which connection is of course to be understood as one in which the field and armature are connected in series. In order to convey the current from the generator to the motor, it is necessary to provide the field member 3 of the generator with a pair of collector-rings 8, connected, respectively, to the generator-terminals. Brushes 9, bearing upon these collector-rings, convey current to the terminals of the motor 5, these brushes being mounted upon some fixed support, and, preferably, upon the field-magnet structure 6 of the motor. A rheostat 10, connected in shunt to the field-winding of the motor, serves to regulate or vary the counter electromotive force of the motor, and thus regulate or vary the current or energy developed by the generator, thereby in turn altering the torque or speed of the driven mechanism.

Fig. 2 is a diagram of the electric circuits of the dynamo-electric machines shown in Fig. 1. At the left-hand portion of Fig. 2 the armature of the generator is indicated at 2 to correspond with the designation in Fig. 1, while the field-magnet winding is for a like reason designated 3. The commutator of the generator is represented at 11, the same numeral being applied to the corresponding part in Fig. 1. Brushes 12 bear upon the commutator and are connected so that the field-winding 3 is in series with the armature 2. One terminal of the field-winding and one brush are connected to the collector-rings 8, upon which bear the brushes 9, by which current is conveyed from the generator to the motor. (Represented in diagram at the right-hand portion of Fig. 2.) This motor has its field 6 connected in series with its armature 7 and receives current directly from the generator. As a convenient means for varying the counter electromotive force of the motor I provide a variable resistance 10, afforded by a rheostat, which I connect in shunt to the field-terminals, as indicated. By turning the movable contact 11' of the rheostat the resistance may be increased or decreased. A switch 12' for short-circuiting the motor is operated by a switch-tripping cam 13, geared to the rheostat so that when the latter is turned into the off position the switch is thrown so as to close the circuit about the motor.

When the apparatus is in operation, a variation of the field strength of motor occasioned by manipulation of the rheostat 10 varies the counter electromotive force of the motor, and this electromotive force being developed in a circuit in series with the generator varies the current developed by the generator. If the counter electromotive force be increased by strengthening the field of the motor, the current flowing in the generator-circuit is decreased, thereby decreasing the torque exerted between the two members of the generator. The torque exerted upon and the speed transmitted to the driven mechanism through the sprocket-chain 4 therefore decrease. On the other hand, if the field strength of the motor be weakened by diverting current from the field-winding or otherwise more current flows in the generator-circuit, thereby increasing the torque between the members of the generator. This may result in a speeding up of the mechanism driven through the sprocket-chain 4 or other power-transmitting device, the power developed in the generator in the form of electrical energy through the medium of which the torque is transmitted to the driven mechanism being returned to the power-supply system through the instrumentality of the motor 5. The mechanism is in condition for transmitting maximum torque when the short-circuiting switch 12' is closed, thereby short-circuiting the generator directly upon itself. The short-circuiting of the motor has no effect, since as soon as it commences to develop current the direction of the current is such as to reduce the field magnetism to zero, thus immediately preventing the generation of current.

Instead of arranging the generator and motor as shown in Fig. 1 it is obvious that various other arrangements may be employed. Thus in Figs. 3 and 4 the elements of the generator and motor are mounted one within another instead of being mounted on or about extensions of the same shaft, as in Fig. 1. In Fig. 3 the fixed field-magnet structure of the motor is indicated at 14 in side elevation and in Fig. 4 in longitudinal section. The motor and generator armature-windings are carried on a rotating ring 15, secured to two flanges or end members 16 17, one flange or member 16 being secured to or integral with a shaft 18, which is intended to be connected mechanically to the prime mover or other source of power, while the other flange or end member 17 is integral with or connected to a sleeve 19, rotatably mounted upon a shaft 20, having bearings at one end in a journal-box 21, formed in the fixed field structure 14 of the motor and at the other end in a bearing 22, centrally located in the flange 16. The armature-winding of the motor is contained in slots on the outer surface of the ring 15, as indicated at 23, while the generator-winding is similarly located in slots on the inner surface of the ring, as indicated at 24. The armature-winding of the motor is therefore in proper relation to the polar projections of the fixed field structure 14, while the generator-winding is similarly related to the internal revolving field structure 25, mechanically secured to the shaft 20, by which mechanical motion is transmitted directly to the load, in the present instance through a worm-gear 26, coöperating with one member 27 of a differential gear supposed to form part of the driving mechanism of an automobile or other power-consuming mechanism. The electrical connections of the dynamo-electric machines illustrated in Figs. 3 and 4 are practically identical with those already described in connection with Fig. 2, so that no further mention thereof seems necessary.

The mechanisms which I have thus far described as suitable for carrying out my invention are arranged to operate through the instrumentality of direct current; but it will readily be understood that my invention is not necessarily limited to the employment of dynamo-electric machines utilizing direct current, since its beneficial effects may also be obtained from the employment of machines of a character other than that described. Thus, for example, I may make use of an alternating-current generator and an alternating-current motor in place of the direct-current generator and motor already described. Thus in Fig. 5 I have illustrated speed-varying mechanism operating through the instrumentality of alternating currents.

As before, the prime mover or other mechanical power-developing device is indicated at 28, this power-developing device being connected, similarly to the instances before mentioned, to one element of a generator and one element of a motor, the dynamo-electric machines in the present instance being of course of the alternating-current type. The generator is represented at 29 and consists of an armature 30, which is mechanically coupled to the prime mover 28 and a rotating direct-current field-magnet structure 31, geared through a sprocket-chain 32 or other mechanical power-transmitting device to some suitable load. (Not shown.) An alternating-current induction-motor is represented at 33, and, as shown, has its rotating member 34, which in the present instance is the inducing member, mechanically connected to the armature 30 of the generator. The fixed member 35 of the motor, which in the present instance is the induced member, has its induced circuits or windings connected to external resistances 36, which are adapted to be varied by means of a manually-controlled resistance-changing device 37 of any ordinary or well-known construction. The generating member 30 of the alternator is provided with a generating-winding of any type usual in connection with alternating-current generators—as, for example, a three-phase winding—and leads from the terminals of this winding are extended through an opening in the shaft 38, connecting the rotating elements of the motor and generator to a similar winding on the rotating member of the motor. The connections between the machines are indicated in dotted lines. The rotating field-magnet of the generator is energized by direct current from any suitable source and as represented is arranged to receive current from a storage battery or other source of direct current 39, which current is conveyed to the rotating field member through brushes 40, bearing upon collector-rings 41, secured to said rotating member and connected, respectively, to terminals of the field-winding. The currents developed by the relative rotation of the members of the alternating-current generator 29 are transmitted to the inducing member 34 of the motor, the connections of which are so made that the torque of the motor assists the torque of the prime mover 28. In order to vary the torque or speed transmitted to the load on the prime mover, the resistance 36 of the motor 33 is varied, so as to vary the current taken by the motor, and as a consequence the current developed by the generator. This arrangement while effective is not as economical as the direct-current machines described in connection with Figs. 1 to 4, inclusive, owing to the energy lost in the form of heat in the regulating-resistance 36.

Instead of employing a storage battery 39 for supplying the direct current to the field-winding of the generator 29 it will be evident that I may provide the generator with a rectifying-commutator, whereby alternating current developed by the generator is in part at least changed into direct current for supplying the field-magnets. An arrangement for effecting this purpose and in which certain other changes in structure are embodied is represented in Fig. 6 of the drawings. In this figure the motor and generator armatures of the alternating-current machines are consolidated into a single armature 42, which is adapted to be mechanically connected to the prime mover, as in Fig. 5. Associated with this armature is the rotating field-magnet structure 43, corresponding to the field-magnet of the generator of Fig. 5 and the fixed induced member 44 of the motor corresponding to the induced member 35 of the motor in Fig. 5. The armature 42 is provided with a rectifying-commutator 45, upon which bear brushes 46, by which current is conveyed to the field-coils of the generator-field structure 43. As in Fig. 5, the generator-field structure is provided with a sprocket or other gear mechanism 47 for the purpose of transmitting power mechanically to the load which it is desired to operate. The operation of the mechanism in Fig. 6 is substantially the same as that of the mechanism described in connection with Fig. 5, and therefore requires no further elaboration.

Although in the foregoing description I have set forth various embodiments of my invention and details in the construction thereof, I do not wish to be limited to the exact arrangements shown, since my invention is capable of many other applications and embodiments than those set forth.

What I claim as new, and desire to secure by Letters Patent of the United States, is—

1. The combination of a motive device, a current-generating device having relatively movable members, connections between one of said members and said motive device, means for transmitting mechanical power through the medium of the reactive force exerted between said members when current is being generated thereby, and means for transforming a portion of the electrical energy of said current into mechanical energy, and applying it to the connections of the motive device.

2. The combination of a motive device, a dynamo-electric generator having two movable members, one driven by said motive device and the other geared or otherwise mechanically connected so as to transmit motion, an electric motor supplied with energy from said generator and mechanically connected so as to combine its torque with that of the motive device, and means for varying the torque of said electric motor.

3. The combination of a prime mover, a dynamo-electric generator having one of its relatively movable members driven by said prime mover, gearing or other mechanical connections for transmitting mechanical motion from the other member of said generator, and means for utilizing electrical energy developed by relative motion between the members of said generator to assist said prime mover in driving said generator.

4. The combination of a prime mover, a dynamo-electric generator having one of its relatively movable members geared thereto, a mechanical power-transmitting device geared or otherwise connected to the other member, an electric motor connected so as to apply its torque to the prime mover, and connections for supplying said motor with electrical energy developed by said generator.

5. The combination of a motive device, a direct-current generator having two movable members, a power-transmitting connection between one of said members and said motive device, mechanical power-transmitting means associated with the other member of said generator, a direct-current motor having one of its members fixed and the other movable with the driven member of said generator, and means for regulating the torque of said motor.

6. The combination of a motive device, a direct-current generator having two movable members, a power-transmitting connection between one of said members and said motive device, mechanical power-transmitting means associated with the other member of said generator, a direct-current motor having one of its members fixed and the other movable with the driven member of said generator, and means for varying the field strength of said motor.

7. The combination of a motive device, a direct-current generator having two movable members, a power-transmitting connection between one of said members and said motive device, a mechanical power-transmitting device associated with the other member of said generator, a direct-current motor having one of its members fixed and the other movable with one of the members of said generator, and means for short-circuiting said generator.

8. The combination of a motive device, a dynamo-electric generator having two movable members, one driven by said motive device and the other mechanically connected to transmit motion, an electric motor mechanically connected to add its torque to that of the motive device, the windings of said motor being connected in series with each other and with the windings of the generator, and means for varying the effective turns of the field-winding of the motor.

9. The combination of a motive device, a dynamo-electric generator having two movable members, one driven by said motive device and the other mechanically connected to transmit motion, an electric motor mechanically connected to add its torque to that of the motive device, a circuit comprising both windings of both generator and motor in series, and means for controlling the amount of current-flow in said circuit.

10. The combination of a motive device, a dynamo-electric generator having two movable members, one driven by said motive device and the other mechanically connected to transmit motion, an electric motor mechanically connected to add its torque to that of the motive device, the windings of said motor being connected in series with each other and with the windings of the generator, and means for varying the effective turns of the field-winding of one or both machines.

11. In combination, a prime mover, a driven member, and transmission mechanism adapted to transmit the power of the prime mover to the driven member comprising two dynamo-electric machines, one of said machines having both members movable, and means for varying at will the relative torque per ampere of said machines to vary the speed and torque of the driven member relatively to the prime mover.

12. In combination, a prime mover, a driven member, and transmission mechanism adapted to transmit the power of the prime mover to the driven member comprising two dynamo-electric machines, one of said machines having both members movable, and means for varying at will over wide ranges the relative field strengths of said machines whereby the relative torque per ampere of said machines is varied over wide ranges.

13. In combination, a prime mover, a driven member, and transmission mechanism adapted to transmit the power of the prime mover to the driven member with different relations of speed and torque comprising two series-wound dynamo-electric machines connected in series, and means for varying the relative torque per ampere of said machines.

14. In combination, a prime mover, a driven member, and transmission mechanism adapted to transmit the power of the prime mover to the driven member with different relations of speed and torque comprising two series-wound dynamo-electric machines connected in series and means for varying the relative field strengths of said machines.

In witness whereof I have hereunto set my hand this 24th day of November, 1902.

ELIHU THOMSON.

Witnesses:
DUGALD McK. McKILLOP,
JOHN A. McMANUS.